United States Patent

Krassnitzer et al.

[11] Patent Number: 5,557,979
[45] Date of Patent: Sep. 24, 1996

[54] GEAR BOX

[75] Inventors: Otto Krassnitzer; Alfred Zitz; Robert Felber, all of Zeltweg, Austria

[73] Assignee: VOEST-ALPINE Bergtechnik Gesellschaft mbH, Zeltweg, Austria

[21] Appl. No.: 420,836

[22] Filed: Apr. 11, 1995

[30] Foreign Application Priority Data

Apr. 11, 1994 [AT] Austria ........................ 736/94

[51] Int. Cl.⁶ ........................................ F16H 3/02
[52] U.S. Cl. ........................................ 74/377
[58] Field of Search .............. 74/325, 373, 377; 192/20, 48.1, 69.9

[56] References Cited

U.S. PATENT DOCUMENTS

| | | | |
|---|---|---|---|
| 1,439,402 | 12/1922 | Buckwalter | 74/325 |
| 1,447,856 | 3/1923 | Johnson | 74/325 |
| 1,459,578 | 6/1923 | Densmore | 74/377 |
| 1,927,641 | 9/1933 | Griffith | 74/373 |
| 1,947,847 | 2/1934 | Harvey | 74/377 |
| 2,245,815 | 6/1941 | Peterson et al. | 74/377 |
| 2,534,134 | 12/1950 | Kirkpatrick | 74/330 |
| 3,152,657 | 10/1964 | Ede et al. | 74/377 |
| 5,226,338 | 7/1993 | Reynolds et al. | 74/333 |

FOREIGN PATENT DOCUMENTS 2096252  10/1982  United Kingdom .

*Primary Examiner*—Dirk Wright
*Attorney, Agent, or Firm*—Cushman Darby & Cushman

[57] ABSTRACT

In a gearbox (1) with coaxial drive shaft (2) and driven shaft (3), wherein a clutch sleeve (5) which can be displaced in the axial direction (4) of these shafts (2,3) can be moved from a coupling position in which the drive shaft (2) and driven shaft (3) are directly connected into a position in which the shafts (2,3) are connected at least by one gear stage (16,17), the clutch sleeve (5) is constructed with at least one internal gear (7) and at least one external gear (9, 14) wherein in the directly coupled position of the shafts (2,3) these are connected with each other by means of an internal gear (7) and an external gear (9) of the clutch sleeve (5). With a gearbox (1) of this type with extremely short construction and at extremely low mounting expenses high torques can be securely transmitted and one can simply switch over from a first switching stage to a second switching stage.

10 Claims, 3 Drawing Sheets

GEAR BOX

BACKGROUND OF THE INVENTION

1. Field of the Invention

The present invention relates to a gearbox with coaxial drive and driven shafts, wherein a clutch sleeve which can be displaced in the axial direction of these shafts can be moved from a coupling position in which the drive and driven shafts directly connected into a position in which the shafts are connected at least by one gear stage.

2. The Prior Art

The use of different motors for different numbers of revolutions has already been known in conjunction with the cutting of hard rocks. Thus, for example, it has already been suggested to change over from a fast-running electric motor to a slowly running hydraulic motor, in which case, however, when changing over to the slower cutting speed only a reduced output of the hydraulic motor could be made use of. However, a high cutting capacity is required even at lower cutting speeds, especially when cutting hard rocks, which capacities cannot be achieved with slowly running hydraulic motors.

As a rule, gearboxes known so far have relatively large dimensions and consequently, especially when high torques have to be transmitted, the entire jib geometry had to be modified, since such a gearbox cannot be used in existing designs without problems.

A gearbox with a short construction, which is constructed as a multi-path gearbox with torque equalisation, is known already, for example, from German patent 2 419 673. In this known construction a clutch sleeve, displaceable in the axial direction of the coaxial drive and driven shafts, is provided, which in a central position reaches a disengaged position. In one of the displaced positions of the clutch sleeve the input and output shafts are connected directly with each other. In any case, due to its construction the clutch sleeve is engaged with the respective gears only over a relatively short axial length and, for the purpose of transmitting greater torques, this design requires a greater axial overall dimension. Moreover, in the case of this known construction a relatively more expensive mounting is required for the intermediate shafts and the individual parts of the transmission, as well as for the drive and driven shafts.

SUMMARY OF THE INVENTION

The present invention seeks to produce a gearbox of the aforementioned general type which can have an extremely short construction and can safely transmit high torques at extremely low expenses for mounting and can be simply switched over from a first switching stage to a second switching stage. In particular an intermediate drive of very short construction should be produced, which in the case of jib drives can be installed between the jib motor and the jib transmission, instead of the usual elastic clutch, so that in these cases the entire output of the motor can be converted even when the cutting speeds are reduced.

Due to the fact that the clutch sleeve has at least one internal gear and at least one external gear and that, in the directly coupled position of the shafts, these shafts are connected with each other by means of an internal gear and an external gear of the clutch sleeve, the clutch sleeve or the change gear can be mounted cantilevered, while the clutch sleeve can transmit high torques reliably even when the axial overall length is small due to the introduction of the force into the clutch sleeve. The alternating engagement of the internal and external teeth leads not only to an improvement of the introduction of the force into the clutch sleeve but, naturally, also to a considerably smaller sensitivity to tolerances, so that the operational reliability will be increased at the same time. The provision of the clutch sleeve with at least one internal gear and at least one external gear allows altogether to arrange the various switching functions on a correspondingly thick-walled but short sleeve component and thus reliably transfer the corresponding torques in every position. It is an advantage of the construction that, for the direct coupling of the shafts, the internal gear and the external gear of the clutch sleeve are arranged approximately on the same diameter, consequently assuring as symmetrical a load as possible on the clutch sleeve.

For the second switched position, whereby a reducing gearing could be active, the construction is advantageously executed so that the clutch sleeve has a further external gear which is arranged on a larger diameter which, when disconnecting the direct connection of the shafts, can be moved to be engaged with the internal teeth of an intermediate gear, which intermediate gear is engaged with a load distribution stage, particularly with planetary gears. Due to the fact that further external teeth are provided on the larger diameter on the clutch sleeve, in the case of the corresponding reducing gearing ratio a greater torque will be reliably transmitted via the teeth even at a shorter axial length, and once again an introduction of force will be assured whereby all torques can be safely absorbed by the switching or clutch sleeve.

A particularly simple and operationally reliable mounting of the individual components is effected with correspondingly low mounting expenses in that one of the shafts has a cylindrical mandrel, a clutch boss connected with one of the shafts in such a manner that they cannot rotate relative each other which overlaps the mandrel being connected with an internal gear and the clutch sleeve being mounted displaceably in a sliding manner on the mandrel and in the annular clearance between the mandrel and the clutch boss so that it can be engaged with an external gear.

In the second switched position too, in which the shafts are connected with each other via an additional gear stage, while having extremely small dimensions in the axial direction a reliable transmission of the forces can be achieved with a short clutch sleeve in that the external teeth of the clutch sleeve provided on the greater diameter are provided on an annular extension which rebounds in the direction of the external teeth which plunge into the clutch boss, which annular extension in that end position of the clutch sleeve in which it plunges in the clutch boss surrounds the clutch boss partially with a clearance.

By virtue of the arrangement of the teeth the advantageous construction can be achieved so that the axial length of the external teeth of the clutch sleeve which engage the clutch boss is greater than the axial length of the further teeth of the clutch sleeve, due to which the advantage is achieved that both the drive pinion and the clutch sleeve can be mounted cantilevered.

DESCRIPTION OF THE DRAWINGS

In order that the invention may be more clearly understood and put into practical effect there shall now be described in detail preferred embodiments of a gearbox in accordance with the present invention. The ensuing description is given by way of non-limitative example only and is with reference to the accompanying drawings, wherein.

DETAILED DESCRIPTION OF PREFERRED EMBODIMENTS OF THE INVENTION

Figure 1:
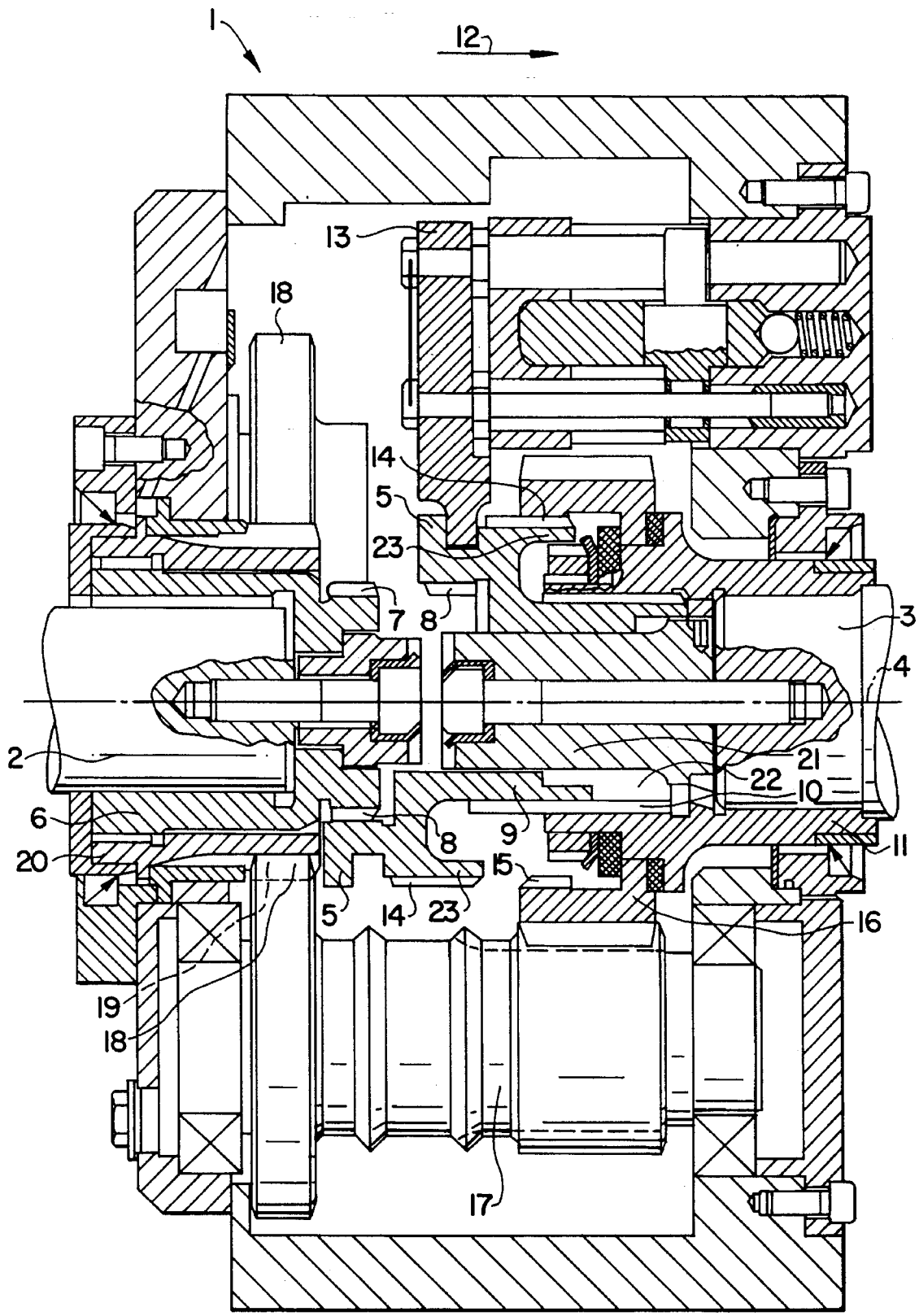
FIG. 1 is a sectional view of a first embodiment of a gearbox according to the invention.

FIG. 1 illustrates a section across a gearbox 1 wherein a drive shaft 2 is provided coaxially with a driven shaft 3, the common axis of which is designated by 4. In a first position of a clutch sleeve 5, which position is illustrated in the bottom half of FIG. 1, a direct coupling between the drive shaft 2 and the driven shaft 3 takes place via the clutch sleeve or the change gear 5. For this purpose a clutch part 6 with external teeth 7 is secured on the drive shaft 2 by means of a key, while the teeth 7 in the position illustrated in the bottom part of FIG. 1 engages the internal teeth 8 of the clutch sleeve 5. On a diameter which is approximately the same as that of the internal teeth 8, the clutch sleeve 5 has external teeth 9, which engage with the internal teeth 10 of a clutch boss 11 which is rigidly connected with the driven shaft 3. Thus a direct coupling of the shafts 2 and 3 takes place by means of the teeth 7, 8, 9 and 10, respectively, which engage each other.

In the top part of FIG.1 the clutch sleeve 5 is illustrated in a second position, in which the coupling of the shafts 2 and 3 takes place by means of an intermediate gear stage. By displacing the clutch sleeve 5 in the direction of arrow 12, which displacement is carried out via a control element 13 engaging the clutch sleeve 5, the external teeth 14 of the clutch sleeve, which teeth are provided on a diameter greater than that for the teeth 8 and 9, will engage the internal teeth 15 of a planetary gear 16, which engages a pinion 17, while the pinion 17 by means of teeth 18 engages a drive pinion 20 via its teeth 19, while the drive pinion is secured additionally by a key on the drive shaft 2. In this manner the direct connection or coupling of the drive shaft 2 and driven shaft 3 is interrupted in this position of the clutch sleeve 5 and the driving is carried out via the intermediately connected gear stage, comprising the planetary gear 16 as well as the pinion 17. To ensure an orderly absorption of torques which may be large under certain circumstances, in this case three gears 17 are provided for example, offset at 120° C. to each other.

In the embodiment shown in FIG. 1 the driven shaft 3 has a cylindrical mandrel 21, wherein this mandrel 21 is partially overlapped by a pinion 11 which is constructed as a clutch boss, while the clutch sleeve 5 is displaceably mounted in the annular gap 22 between the mandrel 21 and the clutch boss 11. Furthermore the external teeth 14 of the clutch sleeve 5 arranged on the larger diameter is provided on an annular extension 23 of the clutch sleeve 5, while this extension 23 surrounds the clutch boss 11 partially with a clearance in that position of the clutch sleeve 5 which is shown in the top half of FIG. 1.

In the construction according to FIG. 1 the clutch sleeve 5 is mounted cantilevered on the driven shaft 3 and particularly on its mandrel 21, while the clutch part 6 is mounted on the drive shaft 2. Thus the clutch part 6 is detached from the change gear or the clutch sleeve 5. The clutch part 6 is connected with the drive shaft and via external teeth with the drive pinion, in both cases in such a manner that they cannot rotate relative each other.

Figure 2:
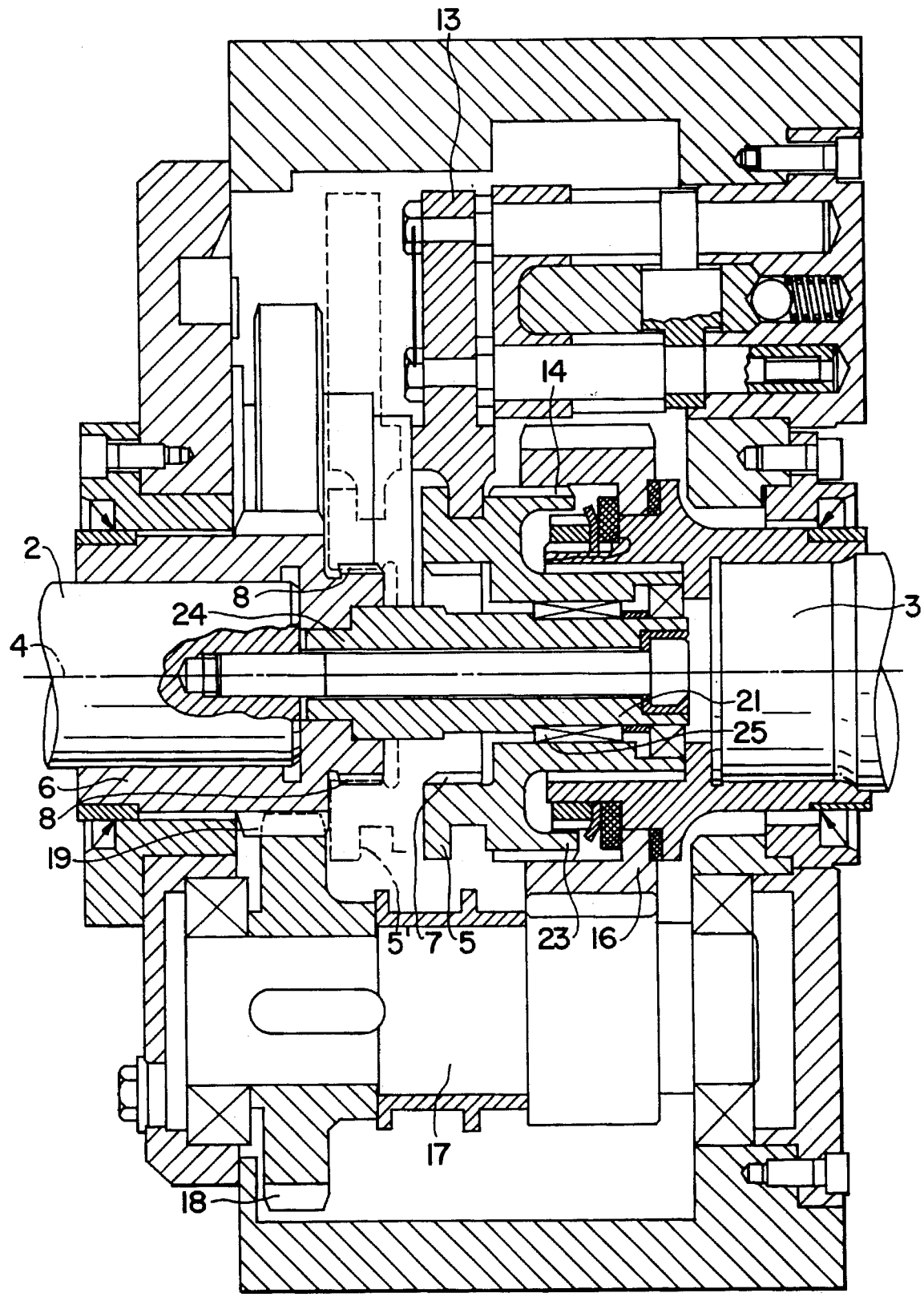
FIG. 2 is a sectional view of a modified embodiment of a gearbox according to the invention, shown similarly to FIG. 1.

In the embodiment according to Fig. 2 the reference numerals used in Fig. 1 have been retained for the same components. In contrast to the design according to FIG. 1, in this embodiment no additional drive pinion is provided, which would engage the teeth 18 of the pinion 17 of the intermediate gear stage, but on the clutch part 6 further teeth 19 are provided on a diameter which is greater than that of teeth 8 in addition to the teeth 8 engaging the clutch sleeve 5, which teeth 19 engage the pinion 17 of the intermediately connected gear stage. In the construction according to FIG. 2 the clutch sleeve 5 is illustrated in that position in which it engages the planetary gear 16 via its external teeth 14. In this case both the clutch part 6 and the clutch sleeve 5 are mounted on the drive shaft 2, for which purpose a mandrel 24, rigidly connected with the drive shaft 2, is provided, while the mounting of the clutch sleeve 5 on the mandrel 24 is schematically illustrated by 25.

In FIG. 2 5' indicates schematically and in dotted line such a position in which the clutch sleeve 5 directly couples the drive shaft 2 with the driven shaft 3.

Figure 3:
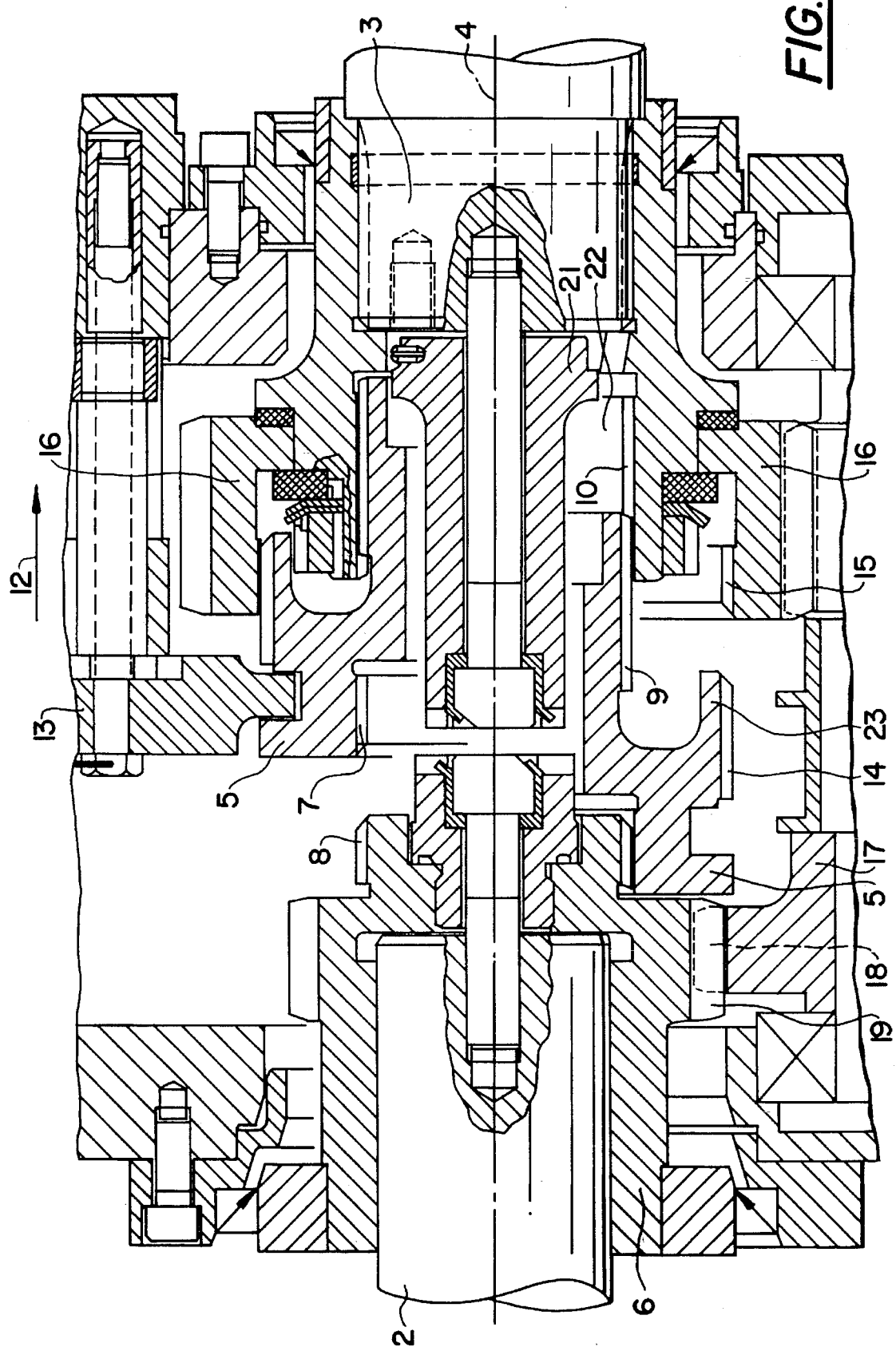
FIG. 3 is an enlarged partial sectional view of another modified embodiment of a gearbox according to the invention.

In FIG. 3, on an enlarged scale similarly to FIG. 1, the clutch sleeve 5 is shown in the first position again as in the bottom part of that Figure, in which position a direct coupling of the shafts 2 and 3 is carried out. In the top half of the Figure a coupling of the shafts 2 and 3 takes place again via the additional gear stage after displacing the clutch sleeve 5 in the direction of arrow 12. Similarly to the construction of FIG. 2, the clutch part 6 has teeth 8 which engage the clutch sleeve 5 as well as external teeth 19 on a larger diameter which engage the pinion 17 of the intermediately connected gear stage.

We claim:

1. A gearbox having coaxial drive and driven shafts, said gearbox comprising a clutch sleeve movable in the axial direction of the shafts between a first position, in which the drive and driven shafts are directly coupled, and a second position in which the shafts are connected by at least one gear stage, said clutch sleeve including an internal gear and an external gear arranged on substantially the same diameter, said gears being positioned on the sleeve such that when the clutch sleeve is in the first position, the internal gear couples the sleeve to one of said shafts and the external gear couples the sleeve to the other of the shafts.

2. A gear box according to claim 1, wherein said clutch sleeve includes a further external gear arranged on a larger diameter than the internal gear whereby when the clutch sleeve is in the second position, the further external gear of said sleeve engages internal teeth of an intermediate gear connected to said driven shaft.

3. A gearbox according to claim 2, wherein said intermediate gear comprises a planetary gear.

4. A gearbox according to any one of claims 1 to 3, wherein said clutch sleeve is cantilever mounted with respect to the driven shaft.

5. A gearbox according to any one of claims 1 to 3, further comprising a cylindrical mandrel joined to said driven shaft in coaxial relationship therewith, a clutch boss connected to said driven shaft such that they rotate together, said clutch boss overlapping the mandrel and including a gear which engages one of said internal and external gears of the clutch sleeve as said clutch sleeve is slidably moved along the mandrel whereby the clutch sleeve rotates with the clutch boss and said driven shaft.

6. A gearbox according to claim 5, wherein the gear of the clutch boss is an internal gear which engages the external gear of the clutch sleeve.

7. A gearbox according to claim 5, wherein said further external gear is provided on an annular extension of the clutch sleeve and said larger diameter is greater than the diameter of the clutch boss whereby when the clutch sleeve is one of said positions, said extension overlies at least a portion of the clutch boss with an annular clearance therebetween.

8. A gearbox according to claim 5, wherein the gear of the clutch sleeve which engages the gear of the clutch boss has an axial length greater than the axial lengths of the other gears of the clutch sleeve.

9. A gearbox according to claim 6, wherein the external gear of the clutch sleeve has an axial length greater than the axial length of the internal gear and the further external gear of the clutch sleeve.

10. A gearbox according to claim 7, wherein the gear of the clutch sleeve which engages the gear of the clutch boss has an axial length greater than the axial lengths of the other gears of the clutch sleeve.

* * * * *